(12) United States Patent
Yumiyama et al.

(10) Patent No.: US 6,460,428 B2
(45) Date of Patent: Oct. 8, 2002

(54) STARTER DEVICE FOR STARTING AUTOMOBILE USE ENGINE

(75) Inventors: Shigeru Yumiyama, Hitachinaka (JP); Kazuyuki Mori, Hitachinaka (JP); Mitsutoshi Abe, Hitachinaka (JP); Norio Yanagawa, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 19 days.

(21) Appl. No.: 09/796,535

(22) Filed: Mar. 2, 2001

(65) Prior Publication Data

US 2001/0019983 A1 Sep. 6, 2001

(30) Foreign Application Priority Data

Mar. 2, 2000 (JP) ........................................ 2000-061893

(51) Int. Cl.[7] ................................................. F16C 1/10
(52) U.S. Cl. ........................... 74/502.4; 74/473.15; 74/6
(58) Field of Search ...................... 74/6, 473.15, 502.4; 477/34; 123/195 R–195 HC

(56) References Cited

U.S. PATENT DOCUMENTS

| | | | | |
|---|---|---|---|---|
| 4,782,686 A | * | 11/1988 | Carson | 72/373 |
| 5,046,380 A | * | 9/1991 | Matsumoto et al. | 74/502.4 |
| 5,048,478 A | * | 9/1991 | Bonde et al. | 123/195 A |
| 5,413,200 A | * | 5/1995 | Hirata | 192/101 |
| RE35,425 E | * | 1/1997 | Isom et al. | 123/195 A |
| 5,603,297 A | * | 2/1997 | Wolf et al. | 123/195 C |
| 5,706,702 A | * | 1/1998 | Yamada | 74/473.15 |
| 5,720,247 A | * | 2/1998 | Suzuki et al. | 123/179.25 |
| 5,967,252 A | * | 10/1999 | Saban et al. | 180/230 |
| 6,006,618 A | * | 12/1999 | Yumiyama et al. | 310/90 |
| 6,019,014 A | * | 2/2000 | Jenkins | 403/325 |
| 6,082,218 A | * | 7/2000 | Osborn et al. | 74/473.15 |
| 6,092,436 A | * | 7/2000 | Wirsing et al. | 403/353 |
| 6,178,844 B1 | * | 1/2001 | Burger | 24/541 |
| 6,295,889 B1 | * | 10/2001 | Jones | 403/325 |
| 6,327,928 B1 | * | 12/2001 | Bowerman et al. | 74/473.15 |
| 6,340,265 B1 | * | 1/2002 | Suzuki et al. | 403/299 |

FOREIGN PATENT DOCUMENTS

| | | | | |
|---|---|---|---|---|
| JP | 5-44523 | | 2/1993 | |
| JP | 05-044523 A | * | 2/1993 | ........... F02D/35/00 |

* cited by examiner

*Primary Examiner*—Jack Lavinder
*Assistant Examiner*—Robert A. Siconolfi
(74) *Attorney, Agent, or Firm*—Crowell & Moring LLP

(57) ABSTRACT

In connection with an intermediate anchoring of a manipulation cable connecting between a manipulation side and an actuation side of an automobile transmission mechanism, an intermediate anchoring bracket 22 of the manipulation cable 4 is provide integral with the starter 2. Specifically, a front bracket 21 of the starter 2, which is attached to a transmission block 1 with a high positional accuracy according to an original purpose of improving engagement between a ring gear 32 and a pinion 23, and the anchoring bracket 22 defining the intermediate anchoring point position of the manipulation cable 4 are formed integral. By merely attaching the starter 2 to the transmission mechanism block 1 with a small number of parts, an accurate positioning of the anchoring bracket 22 with respect to an actuation point 1a is realized, thereby, a positional accuracy between the intermediate anchoring point position and the actuation point 1a can be improved.

5 Claims, 2 Drawing Sheets

STARTER DEVICE FOR STARTING AUTOMOBILE USE ENGINE

BACKGROUND AND SUMMARY OF THE INVENTION

1. Field of the Invention

The present invention relates to a starter device for starting an automobile use engine and, in particular, relates to a starter device for starting an automobile use engine which includes an anchoring bracket for intermediately anchoring a manipulation cable coupling between a manipulation side and an actuation side of an automobile transmission mechanism and being formed integral with the starter device.

2. Convential Art

In an automobile use engine provided with a transmission mechanism, a vehicle speed change gear at an actuation side in the transmission mechanism is generally shifted through a manual or automatic manipulation effort at a manipulation side thereof, therefore, the manipulation side and the actuation side thereof are coupled via a mechanical manipulation cable. Further, the manipulation cable is generally anchored at its midway through provision of a dedicated anchoring use bracket formed such as on an engine block and a transmission mechanism so as to limit a neck oscillation movement of a core wire (inner wire) of the manipulation cable.

Now, the above referred to conventional art did not take much into account of a positional accuracy of the intermediate anchoring point of the manipulation cable sheath with respect to a manipulation point of the manipulation cable, an actuation point of the same, the engine and the transmission mechanism block during an assembly work. Therefore, when the position thereof, in particular, with respect to the actuation point deviates some, the motion at the manipulation point side is not correctly transferred to the actuation point side, because the manipulation cable is caught at the midway between the manipulation point and the actuation point or the smooth movement thereof is deteriorated which possibly prevents the vehicle speed change gear shifting or causes an erroneous shifting.

SUMMARY OF THE INVENTION

An object of the present invention is to improve the positional accuracy for the intermediate anchoring point of the manipulation cable with respect to the manipulation point, the actuation point, the engine and the transmission mechanism block and, in particular, with respect to the actuation point and to achieve an accurate vehicle speed change gear shifting.

Another object of the present invention is to provide a starter device for starting an automobile use engine which achieves the above object with a very reasonable and easy means.

In order to achieve the above objects in a combination in which an automobile use engine with a transmission mechanism coupling between a manipulation side and an actuation side thereof through a manipulation cable so as to shift a vehicle speed change gear and a starter device for starting the automobile use engine which rotates a ring gear coupled to a crank shaft of the automobile use engine and starts the automobile use engine, the present invention is to provide a starter device for starting an automobile engine which includes an anchoring bracket for intermediately anchoring the manipulation cable formed integrally therewith.

Further, the present invention preferably provides a starter device for starting an automobile use engine, characterized in that the anchoring bracket is integrally provided with a starter front bracket which is designed to attach the starter device to the engine block.

Still further, the present invention preferably provides a starter device for starting an automobile use engine, characterized in that the anchoring bracket and the starter front bracket are formed integrally by molding through aluminum casting.

In the present invention as has been explained above, by making use of the starter device which is attached to either the engine block or the transmission mechanism block with a good positioned accuracy according to an original purpose of improving engagement between the ring gear and the pinion gear of the starter device, the starter front bracket and the anchoring bracket for intermediately securing the manipulation cable are formed integrally.

In addition, as a conventional example in which a starter and another electrical part, for example, a rotation sensor are formed integrally JP-A-5-44523 (1993) is already known, however, JP-A-5-44523 (1993) does not relate to the intermediate anchoring for the manipulation cable as in the present invention and suggests no specific means therefor.

DETAILED DESCRIPTION OF THE PREFERRED EMBODIMENT

Herein below, an embodiment of the present invention will be explained with reference to FIGS. 1 through 4.

Figure 1:
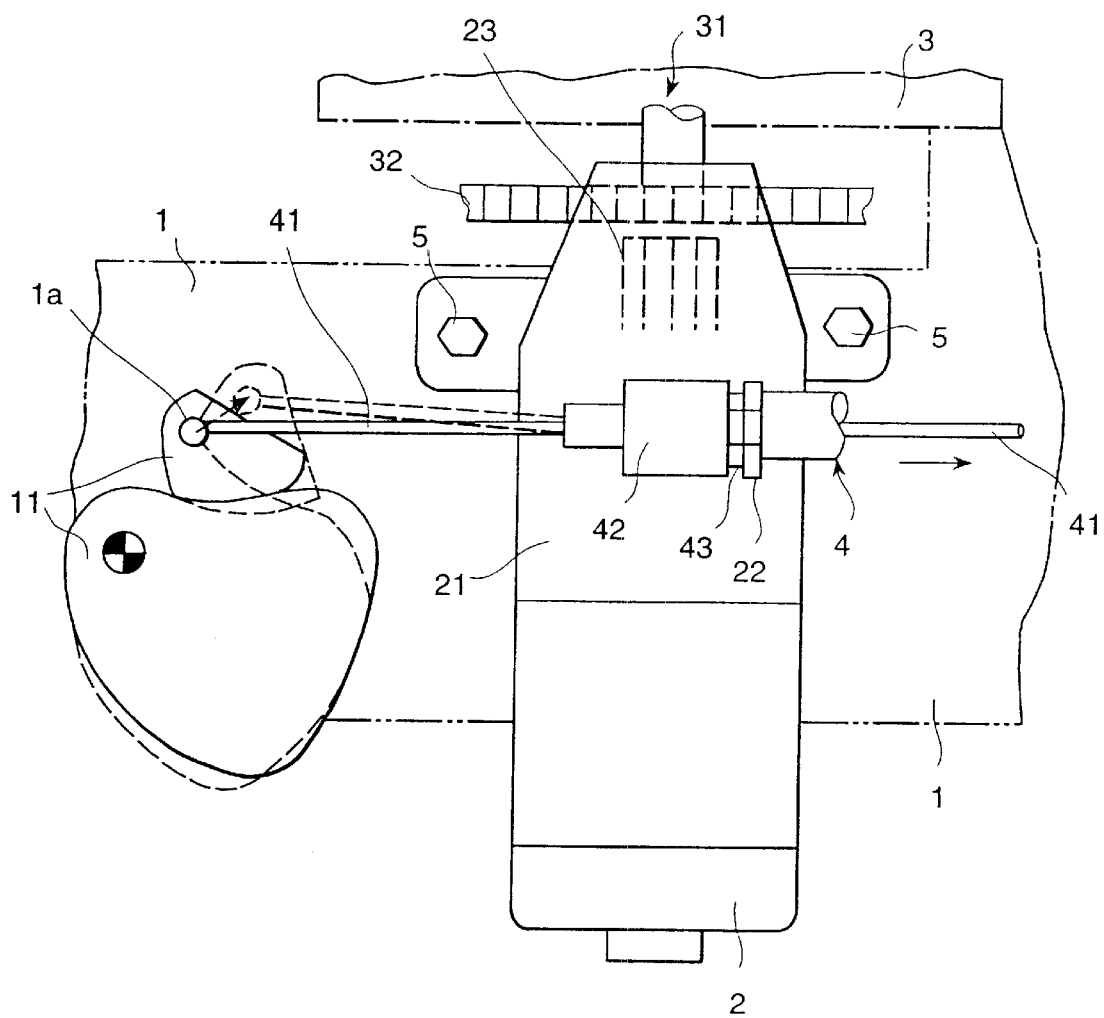
FIG. 1 is a front view showing an overview combination structure of an embodiment according to the present invention.

In FIG. 1 a starter 2 which is designed to start an automobile engine is provided with a pinion 23 which is rotated by a motor not illustrated, and when the pinion 23 is displaced upward direction in FIG. 1 and is engaged with a ring gear 32, the engine is started. Therefore, a front bracket 21 in the starter 2 is attached and secured to a transmission mechanism block 1 by bolts 5 through such as spigot fit, knock pin fit and face match fit in order to position with a good accuracy with respect to such as the ring gear 32 and an engine block 3. The ring gear 32 is directly connected to a crank shaft 31 of the engine not illustrated and further the engine block 3 is assembled with the transmission mechanism block 1 so as to be properly positioned with respect to a vehicle speed change gear (not illustrated) in the transmission mechanism block 1. A mechanical manipulation cable 4 is for connecting an actuation point 1a of a cam mechanism 11 for shifting the vehicle speed change gear with an manipulation point (not illustrated) of the transmission mechanism which is manipulated manually or automatically, and an intermediate sheath portion 42 of the manipulation cable 4 is intermediately anchored to an anchoring bracket 22 by means of a clip 43.

Through pushing and pulling of a core wire (inner wire) 41 of the manipulation cable 4 at the manipulation side the actuation point 1a and the cam mechanism 11 are moved and the vehicle speed change gear is shifted, thereby, a vehicle speed change function is achieved.

Further, the purposes of the intermediate anchoring of the manipulation cable 4 are such as for preventing the manipulation cable 4 from interfering with an obstacle at the midway thereof, for smoothing the sliding movement of the core wire 41 and for limiting a range of neck swing of the core wire 41.

The anchoring bracket 22 is molded integral with the front bracket 21 of the starter 2 through aluminum casting. Therefore, the intermediate anchoring sheath portion 42 of the manipulation cable 4 which is attached to the anchoring bracket 22 is positioned and assembled with a high positional accuracy with respect to such as the cam mechanism 11, the actuation point 1a thereof and the transmission mechanism block 1 accommodating the vehicle speed change gear.

Now, details of the intermediate anchoring means of the manipulation cable 4 will be explained with reference to FIGS. 2, 3A–3C and 4.

Figure 2:
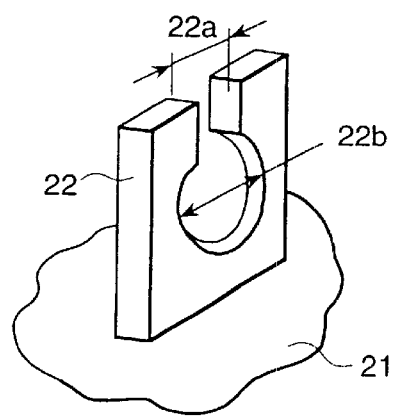
FIG. 2 is a perspective view showing an anchoring bracket in the embodiment according to the present invention.
Figure 3A:
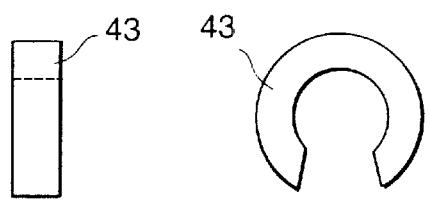
FIGS. 3A through 3C are views for explaining a method of intermediately anchoring a manipulation cable in the embodiment according to the present invention.
Figure 3B:
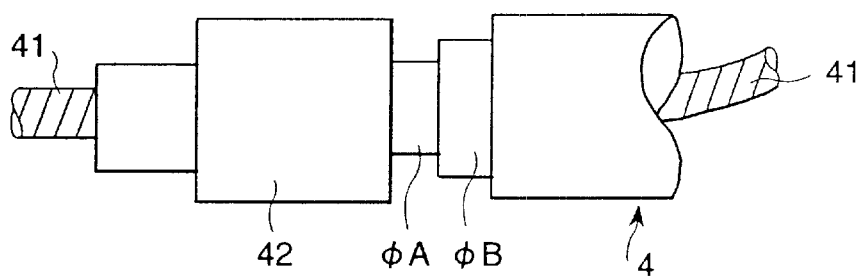
Figure 3C:
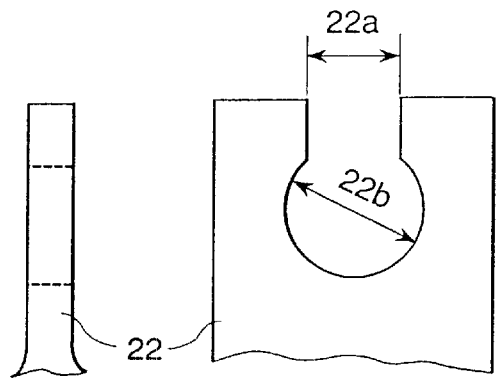
Figure 4:
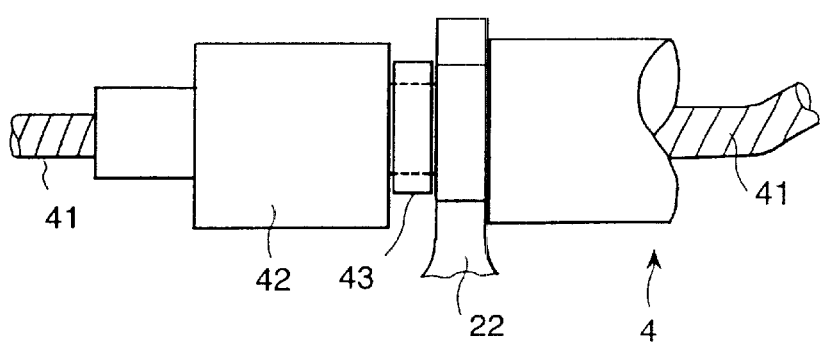
FIG. 4 is a front view of an intermediate anchoring portion of the manipulation cable in the embodiment according to the present invention.

FIG. 2 is a perspective view around the anchoring bracket 22 integrally formed with the starter front bracket 21 and FIGS. 3A–3C and 4 are views for explaining a method of intermediate anchoring of the manipulation cable 4. The anchoring bracket 22 is molded integrally with the aluminum made front bracket 21 as has been explained above, and the anchoring bracket 21 is provided with a cut-out guide portion 22a which permits to pass a part of intermediate anchoring sheath portion 42 having the smallest diameter $\phi A$ of the manipulation cable 4 and a round window 22b into which another part of the intermediate anchoring sheath portion 42 having the second smallest diameter $\phi B$ is to be set.

At first, the part of intermediate anchoring sheath portion 42 having the smallest diameter $\phi A$ of the manipulation cable 4 is passed through the guide portion 22a, then the part thereof having the second smallest diameter $\phi B$ is set into the round window 22b, thereafter, the clip 43 fitted into the part thereof having the smallest diameter $\phi A1$ thus, the intermediate anchoring sheath portion 42 of the manipulation cable 4 is intermediately anchored at the anchoring bracket 22 and resultantly at the front bracket 21 of the starter 2 with a good positional accuracy.

In the present embodiment, the anchoring bracket 22 is molded integral with the front bracket 21 of the starter 2 through aluminum casing, however, the present invention is not necessarily limited to such embodiment, and further with regard to the specific intermediate anchoring means there are of course a variety of modifications. However, according to the present embodiment the manipulation cable can be intermediately anchored with a high positional accuracy through a small number of parts and a comparatively simple means.

In the present invention as has been explained in the above, since the intermediate anchoring means for the manipulation cable is provided integral with the starter device, the intermediate anchoring point of the manipulating cable with respect to the actuation point of shifting the vehicle speed change gear can be positioned with a high positional accuracy by merely attaching the starter device at its predetermined position, thereby, through the improvement of the positioned accuracy an advantage that an accurate vehicle speed change gear shifting can be performed is obtained.

Further, another important advantage that the assembly work thereof can be performed comparatively easily with a small number of parts is also obtained.

What is claimed is:

1. In a combination including an automobile use engine having a transmission mechanism coupling between a manipulation side and an actuation side via a manipulation cable for shifting a vehicle speed change gear and a starter device for starting the automobile use engine for rotating a ring gear coupled to a crank shaft of the automobile use engine to start the same, the starter device for starting the automobile use engine comprising, a anchoring bracket which intermediately anchors the manipulation cable is formed integrally with the starter device for starting the automobile use engine.

2. A starter device for starting an automobile use engine according to claim 1, wherein the anchoring bracket is formed integral with a front bracket of the starter device for anchoring the same to an engine block.

3. A starter device for starting an automobile use engine according to claim 2, wherein the anchoring bracket and the front bracket are molded integral through aluminum casting.

4. A starter device for starting an automobile use engine according to claim 1, wherein the manipulation cable is intermediately anchored to the anchoring bracket via a sheath portion of the manipulation cable.

5. A starter device for starting an automobile use engine according to claim 4, wherein the sheath portion includes a first portion having the smallest diameter $\phi A$ which is permitted to pass a cut-out guide portion formed at the anchoring bracket and a second portion having the second smallest diameter $\phi B$ which is designed to set at a round window formed at the anchoring bracket.

* * * * *